(12) United States Patent
Kitamura et al.

(10) Patent No.: US 7,300,251 B2
(45) Date of Patent: Nov. 27, 2007

(54) TURBINE COOLING VANE OF GAS TURBINE ENGINE

(75) Inventors: Tsuyoshi Kitamura, Hyogo (JP); Kenichiro Takeishi, Hyogo (JP); Masaaki Matsuura, Hyogo (JP); Ryoma Nogami, Aichi (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 10/544,844

(22) PCT Filed: Mar. 3, 2004

(86) PCT No.: PCT/JP2004/002664

§ 371 (c)(1), (2), (4) Date: Aug. 8, 2005

(87) PCT Pub. No.: WO2005/049970

PCT Pub. Date: Jun. 2, 2005

(65) Prior Publication Data

US 2006/0210399 A1    Sep. 21, 2006

(30) Foreign Application Priority Data

Nov. 21, 2003 (JP) .............................. 2003-392331

(51) Int. Cl.
*F01D 5/18* (2006.01)

(52) U.S. Cl. .................... 416/97 R; 416/96 A; 416/232

(58) Field of Classification Search ............... 416/96 A, 416/97 R, 232, 97 A, 233
See application file for complete search history.

(56) References Cited

U.S. PATENT DOCUMENTS

| 4,025,226 | A |   | 5/1977 | Hovan |
| 4,669,957 | A |   | 6/1987 | Phillips et al. |
| 5,624,231 | A |   | 4/1997 | Ohtomo et al. |
| 5,667,359 | A | * | 9/1997 | Huber et al. ............... 416/96 A |
| 5,779,437 | A | * | 7/1998 | Abdel-Messeh et al. .... 415/115 |
| 6,238,182 | B1 | * | 5/2001 | Mayer ....................... 416/96 A |
| 6,616,405 | B2 |   | 9/2003 | Torii et al. |
| 6,676,875 | B1 |   | 1/2004 | Takeuchi |
| 2002/0090295 | A1 |   | 7/2002 | Torii et al. |

FOREIGN PATENT DOCUMENTS

| CH | 86 1 08821 A | 7/1987 |
| CH | 1418284 A | 5/2003 |
| DE | 26 40 827 | 4/1977 |
| DE | 198 45 147 A1 | 4/2000 |

(Continued)

OTHER PUBLICATIONS

Mark D. Wilson et al., "An Advanced High Temperature Turbine for Subsonic Engine Applications", AIAA 94-3372 Jun. 27-29, 1994, pp. 1-7.

*Primary Examiner*—Richard A. Edgar
(74) *Attorney, Agent, or Firm*—Wenderoth, Lind & Ponack, L.L.P.

(57) ABSTRACT

A cooled blade of a small gas turbine engine can enhance cooling performance without increasing the amount of cooling air in a simple configuration. A cooled turbine blade is provided with a cooling passageway 12 formed inside thereof, making the cooling air flow therein. Film-cooling holes 13 penetrate from an inner wall surface 111 to an external wall surface 112 and form a cooling film. An impingement cooling member 2 has a multiple number of small holes 21 ejecting the cooling air. A gap t made by the inner wall surface 111 and the impingement cooling member 2 has a sealing portion 14 mounted thereon which divides the gap in a blade chord direction.

8 Claims, 10 Drawing Sheets

FOREIGN PATENT DOCUMENTS

| | | | |
|---|---|---|---|
| DE | 19845147 A1 * | 4/2000 |
| EP | 1 136 651 A1 | 9/2001 |
| JP | 55-109704 | 8/1980 |
| JP | 55109704 A * | 8/1980 |
| JP | 59-79009 | 5/1984 |
| JP | 62-165504 | 7/1987 |
| JP | 64-8505 | 1/1989 |
| JP | 7-189602 | 7/1995 |
| JP | 7-208104 | 8/1995 |
| JP | 7-293204 | 11/1995 |
| JP | 7-332004 | 12/1995 |
| JP | 9-151703 | 6/1997 |
| JP | 2000-257401 | 9/2000 |
| JP | 2002-115563 | 4/2002 |
| JP | 2002-201905 | 7/2002 |
| JP | 2003-528246 | 9/2003 |

\* cited by examiner

TURBINE COOLING VANE OF GAS TURBINE ENGINE

TECHNICAL FIELD

The present invention relates to cooled blades of a small type of gas turbine engine to be used for airplanes and the like, and more particularly relates to cooled blades used as turbine blades.

BACKGROUND ART

Nowadays gas turbines are used as a power source of many kinds of machinery and equipment. For example, they are used for power plant applications by connecting a generator to their main shaft, or used as engines utilizing the gas turbines as a power source of transportation such as airplanes and the like.

Figure 18:
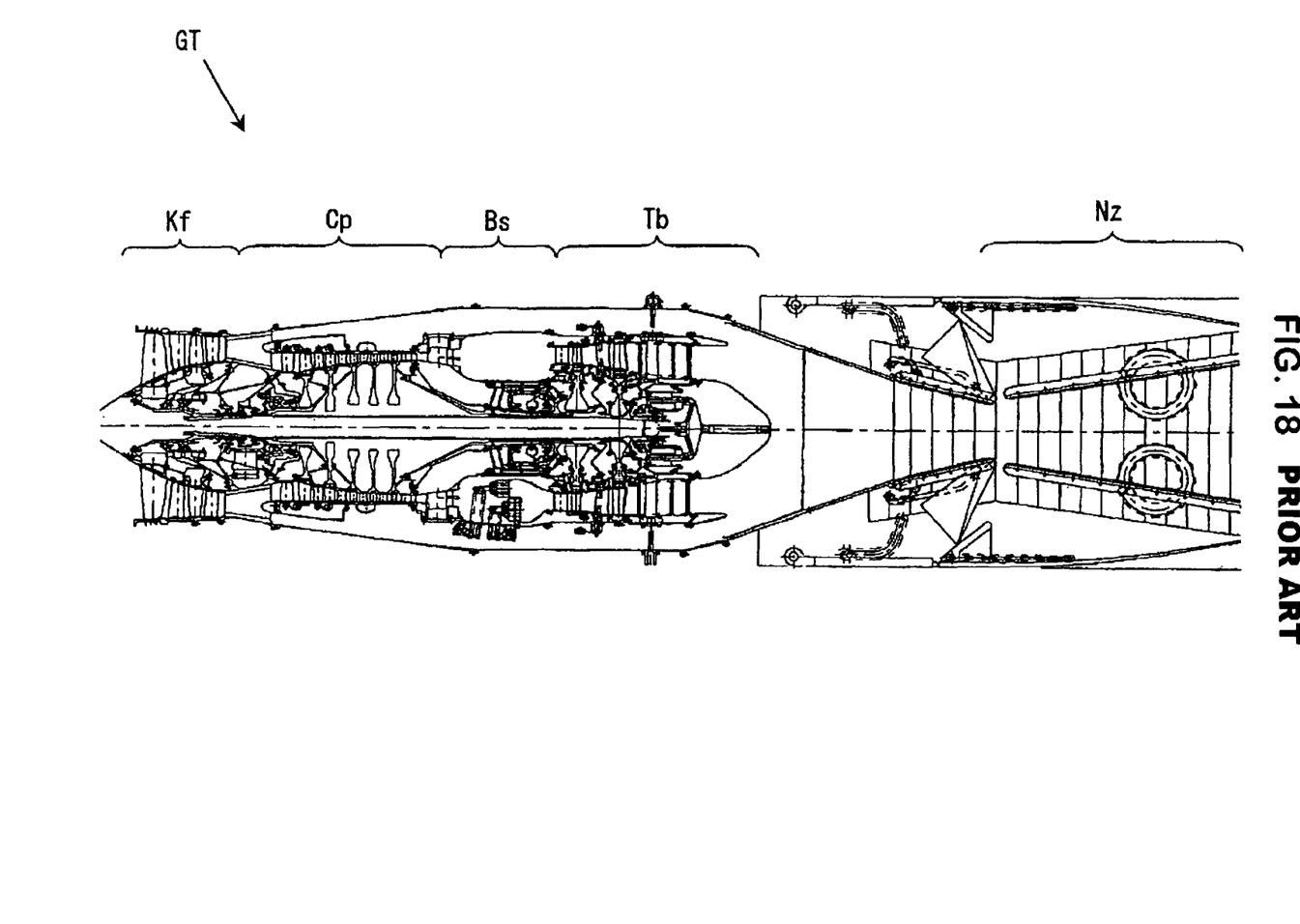
FIG. 18 is a schematic drawing of a conventional small type of gas turbine engine.

FIG. 18 is a schematic drawing of a gas turbine engine. A gas turbine engine GT shown in FIG. 18 has an intake fan Kf installed to an air intake port; a compressor Cp compressing the intake air; a combustor Bs burning fuels by using the air compressed by the compressor Cp; a turbine Tb driven by combustion gas ejected from the combustor Bs; and a nozzle Nz ejecting combustion gas to generate thrust. The intake fan Kf, the compressor Cp and the turbine Tb are connected to each other by the same rotating shaft. Driving the turbine Tb with combustion gas turns the rotating shaft, driving the intake fan Kf and the compressor Cp.

The turbine Tb has stationary vanes and rotating blades. The stationary vanes rectify flow of the combustion gas blown thereto, while the rotating blades rotate with the rotating shaft at their center by having the combustion gas blow thereto. Combustion gas blowing to the stationary vanes and the rotating blades is very high temperature gas, thus generating nonconformances such as thermal deformation, damage and the like due to heat. In order to prevent these nonconformances from occurring, the blades are cooled.

A method of cooling the blades is disclosed in which a part of the compressed air, which is compressed by the compressor Cp and supplied to the combustor Bs, is supplied to the turbine Tb to be utilized as a refrigerant for cooling of the blades. In this method, the blades are cooled by having the cooling air flow inside the blades. Among methods of cooling the blades are a film cooling method, an impingement cooling method, a transpiration cooling method and the like.

Figure 19:
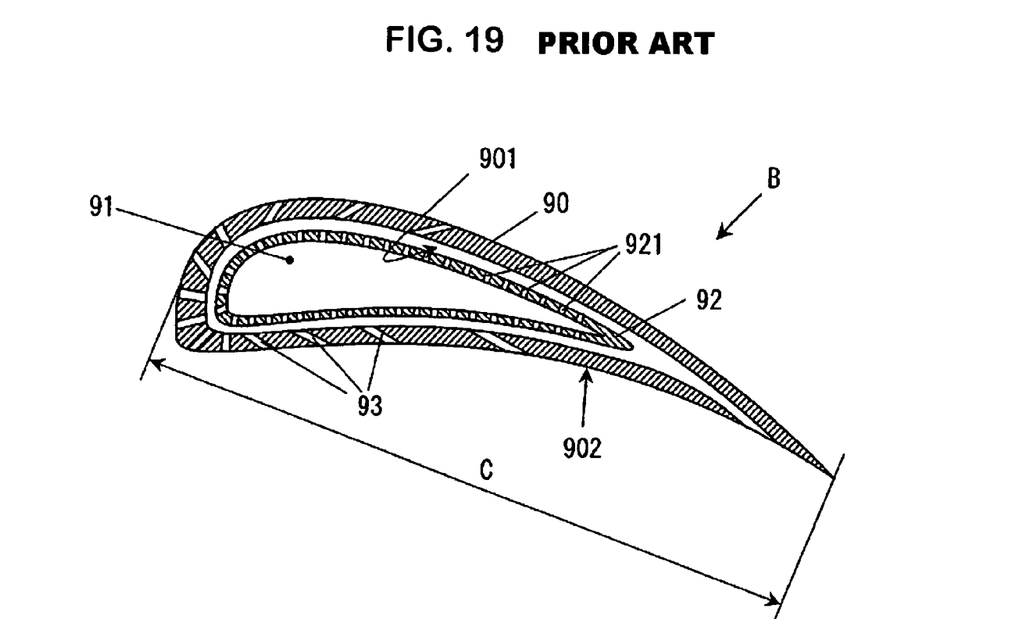
FIG. 19 is a cross-sectional view showing a cooled turbine engine of a conventional high temperature gas turbine engine.

In order to cool turbine blades of high temperature gas turbine engines, after implementation of the impingement cooling method, the film cooling method is also used. FIG. 19 shows a cross-sectional view of a cooled blade of a high temperature gas turbine engine. The cooled turbine blade B shown in FIG. 19 has a cooling passageway 91 formed inside thereof where the cooling air flows. Inside the cooling passageway 91 is mounted an insert 92, having a multiple number of small holes for ejecting the cooling air, leaving a space apart from an inner wall surface 901 of a blade wall 90. The cooling air flowing into the cooling passageway 91 is blown approximately uniformly to the inner wall surface 901 of the cooling passageway 91 through small holes 921 in the insert 92 and cools the inner wall surface 901 and the neighborhood of the inner wall, which is so-called an impingement cooling Additionally, the cooled blade B has film-cooling holes 93 formed therein, penetrating from the cooling passageway 91 to the outside. As a result, the cooling air which completes the impingement cooling will be ejected to an external wall surface 902 of the cooled turbine blade B through the film-cooling holes 93, forming a cooling seal and cooling the cooled turbine blade B from the outside.

The above-mentioned cooling methods are widely adopted to gas turbines for industrial use, such as gas turbines used in power plant applications and the like.

Figure 20:
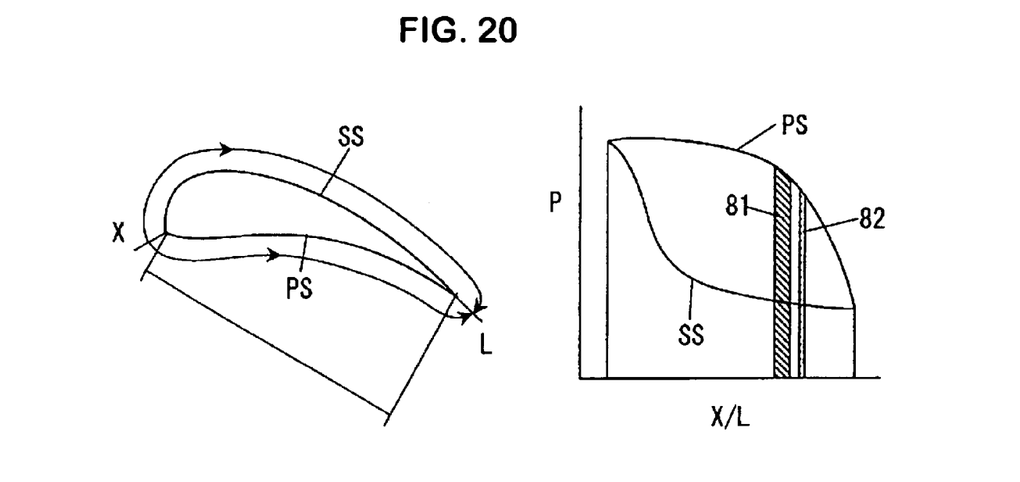
FIG. 20 includes a cross-sectional view of a blade and a graph showing distribution of static pressure around the blade.

Table 1 shows a comparison of various kinds of parameters of cooled blades of a small type of gas turbine engine used for airplanes and the like with those of cooled blades of gas turbines for industrial use such as power generation and the like. Parameters shown in Table 1 include hole diameter d of film-cooling holes, chord length C, blade wall thickness 6 (See FIG. 19 and FIG. 21 described later.), ratio d/C of the film hole diameter versus the chord length and ratio d/δ of the film-cooling hole diameter versus the blade wall thickness. FIG. 20 shows a cross-sectional view of a blade and a graph showing a distribution of static pressure around the blade. The distribution of static pressure around a blade as shown in the graph is for a blade of no dimensions.

TABLE 1

|  | Small Type of Gas Turbine Engines | Gas Turbines for Industrial Use |
| --- | --- | --- |
| Film Hole Diameter d (mm) | 0.4 | 0.8 |
| Chord Length C (mm) | 30 | 200 |
| Blade Wall Thickness |  |  |
| δ (mm) | 1.2 | 5.0 |
| d/C | 0.013 | 0.004 |
| d/δ | 0.33 | 0.16 |

As shown in Table 1, in gas turbines for industrial use, the ratio d/C of the film-cooling hole diameter versus the chord length is 0.004, while in small type of gas turbine engines, the ratio is 0.013, which is a large value. In the graph in FIG. 8, blades are of no dimensions, and the ratio of film-cooling holes of small gas turbine engines and the ratio of those of gas turbines for industrial use are depicted as 81 and 82 in the graph. From the graph, it can be seen that the ratio 81 of the film-cooling holes of small gas turbine engines versus blades is larger than the ratio 82 of those of gas turbines for industrial use versus blades, and it also can be seen that pressure fluctuation at the outlet of the film-cooling holes of small gas turbine engines becomes higher. As a result, combustion gas becomes easier to flow reversely through the film-cooling holes. Therefore, in order to prevent a back flow, it is necessary to increase a margin for the back flow. Namely, it is necessary to make a large amount of the cooling air flow.

Figure 21:
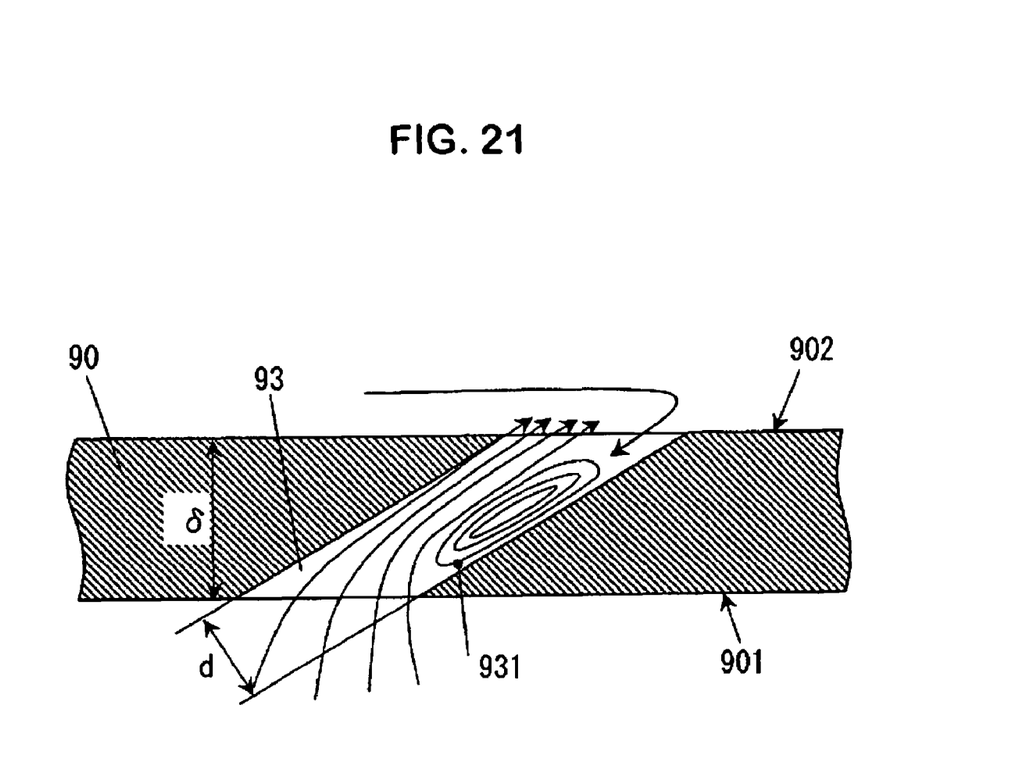
FIG. 21 is a cross-sectional view of a film-cooling hole.

FIG. 21 shows a cross-sectional view of a film-cooling hole. A film-cooling hole 93 is formed so as to incline to the blade wall 90 at a predetermined angle. In the neighborhood of an inner wall surface 901 of a curved surface 931 on the inner wall side of the film-cooling hole 93, exfoliation of the cooling air occurs, wherein the cooling air flows away from the curved surface 931 on the inner wall side of the film-cooling hole 93, and subsequently, flow of the cooling air re-adheres to the curved surface 931 on the inner wall side of the film-cooling hole 93 in the proximity of the external wall surface 902 of the film-cooling hole 93.

When the film-cooling hole 93 does not have a sufficient length longer than a predetermined length, the flow of the cooling air does not re-adhere to the film-cooling hole 93, and high temperature working fluid flows reversely from the outside to a portion where the exfoliation of the cooling air flow occurs. This diminishes cooling performance.

Gas turbines for industrial use have a ratio d/δ of the film-cooling hole diameter versus the blade wall thickness which is 0.16, while small gas turbine engines has a ratio of 0.33, which is a large value. Therefore, the film-cooling hole 93 has a difficulty in having a sufficient length for the cooling air flow to re-adhere thereto, and there is a high potentiality of occurrence of a back flow, thus giving an adverse effect on cooling performance of the film cooling. Additionally, it is difficult to apply shaped cooling holes.

Also, as shown in FIG. 20, static pressure around the blade becomes lower toward the downstream side of the flow around the blade. As a result, the working fluid flowing into the inside of the cooled turbine blade B flows toward the downstream side through a gap between the insert 92 and the inner wall 901 of the cooling passageway 91, thereby significantly deteriorating cooling performance of the impingement cooling.

DISCLOSURE OF THE INVENTION

It is an object of the present invention to provide cooled turbine blades for small gas turbine engines which have a simple configuration but can enhance cooling performance without increasing the amount of the cooling air.

In order to achieve the above-mentioned object, according to the present invention, a cooled turbine blade for a gas turbine engine is provided with a cooling passageway which is formed inside the cooled blade and has the cooling air flow therein, film-cooling holes which penetrate from an inner wall surface of the cooling passageway to an external wall surface of the cooled blade and form a cooling film on the external surface thereof, and an impingement cooling member which has a multiple number of small holes through which the cooling air is ejected. The impingement cooling member is arranged inside the cooling passageway, leaving a predetermined gap apart from the inner wall surface The gap formed by the inner wall surface and the impingement cooling member has a sealing portion mounted therein which partitions off the relevant gap in a direction of the blade chord, and the sealing portion is formed between film-cooling holes that are in close proximity to each other in the blade chord direction.

In accordance with the present invention, a cooled turbine blade for a gas turbine engine is provided with a cooling passageway which is formed inside the cooled blade and has the cooling air flow therein, film-cooling holes which penetrate from an inner wall surface of the cooling passageway to an external wall surface of the cooled blade and form a cooling film on the external surface thereof, and an impingement cooling member which has a multiple number of small holes through which the cooling air is ejected. The impingement cooling member is arranged inside the cooling passageway, leaving a predetermined gap apart from the inner wall surface. The film-cooling holes are formed so as to incline to the inner wall surface for a predetermined angle. The inner wall surface is provided with a cooling-air-introducing member which is installed in a manner so that it inclines to the inner wall surface at the same angle as the film-cooling holes and so that it is in a straight line with the inner wall side of an inner tube surface in the film-cooling hole. The cooling-air-introducing member is connected to the impingement cooling member.

In accordance with the present invention, a cooled turbine blade for a gas turbine engine is characterized by the cooled blade having a cooling passageway formed inside thereof for the cooling air to flow therein. Film-cooling holes are formed, penetrating from an inner wall surface of the cooling passageway to an external wall surface of the cooled blade. The film-cooling holes are formed in a manner so that they incline to the inner wall surface for a predetermined angle. The inner wall surface is provided with a cooling-air-introducing member which is installed in a manner so that it inclines to the inner wall surface at the same angle as the film-cooling holes have and so that it is in a straight line with an inner tube surface of the relevant film-cooling hole.

In accordance with the present invention, a cooled turbine blade for a gas turbine engine is characterized by the cooled blade having a cooling passageway formed inside thereof for the cooling air to flow therein. A blade wall of the cooled blade comprises an inner wall having a multiple number of small holes therein and an external wall having film-cooling holes. A gap between the inner wall and the external wall is filled up with a multiple number of spherical members.

BEST MODE FOR CARRYING OUT OF THE INVENTION

Figure 1:
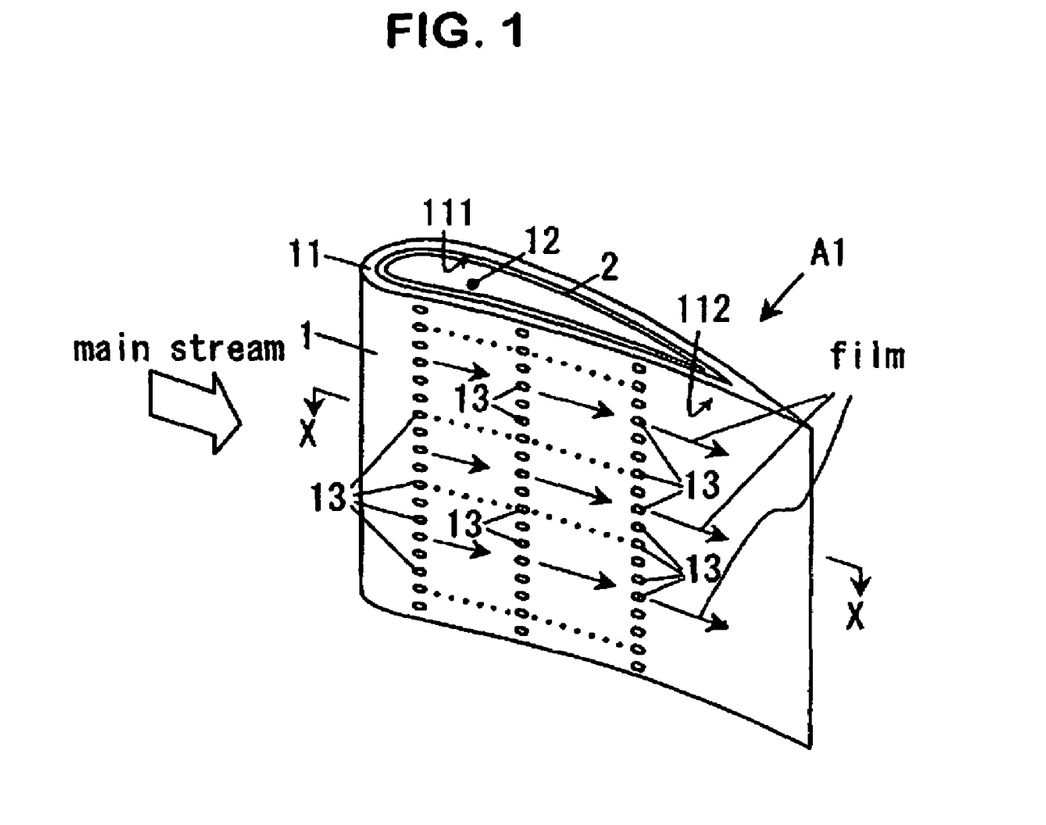
FIG. 1 through FIG. 4 depict a cooled turbine blade for a small type of gas turbine engine in accordance with an embodiment of the prevent invention.
Figure 2:
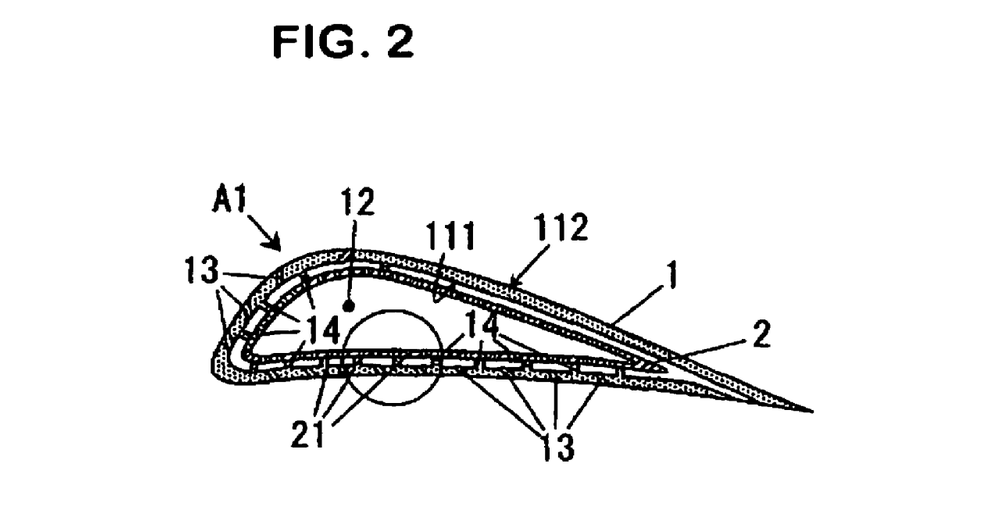
Figure 3:
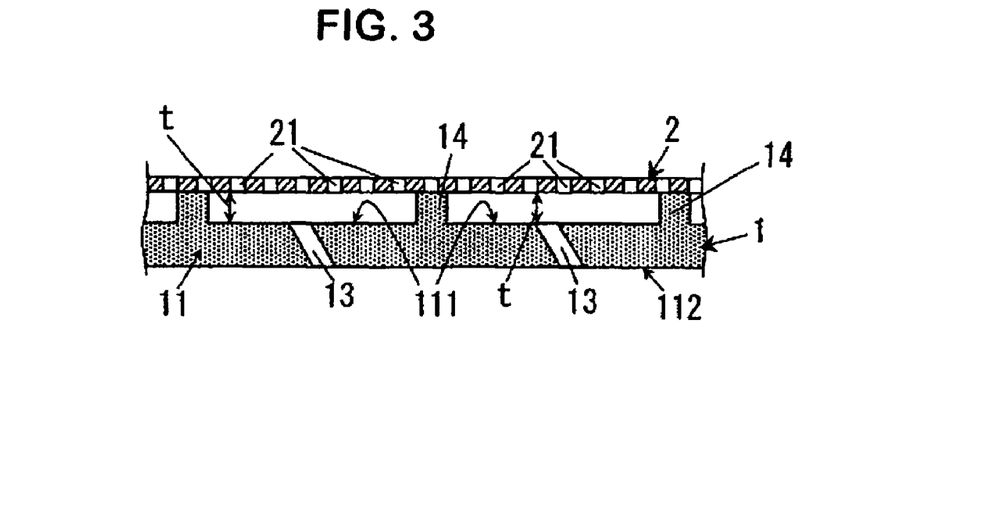
Figure 4:
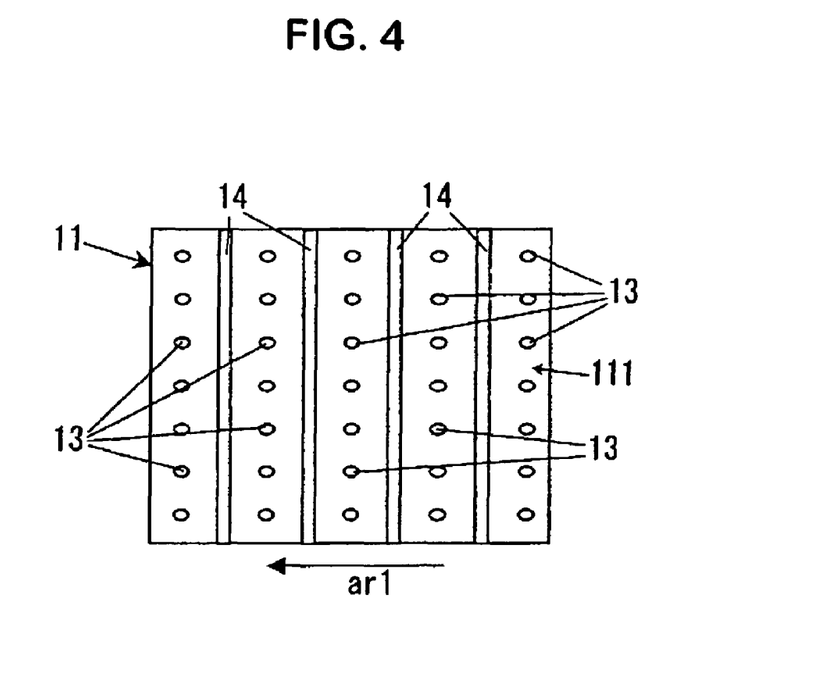

Referring now to the drawings, an embodiment of the present invention will be described hereinafter. FIG. 1 is a perspective view of an example of a cooled blade of a small type of gas turbine engine in accordance with an embodiment of the present invention. Also, FIG. 2 is a cross-sectional view seen from line X-X of the cooled blade of a small type of gas turbine engine shown in FIG. 1. FIG. 3 is an enlarged cross-sectional view of a portion in a circle in FIG. 2. FIG. 4 is a front view of an inner wall surface of the cooled turbine blade shown in FIG. 1 when the blade wall surface is cut into a rectangle.

A gas turbine engine substantially has the same construction as a conventional gas turbine engine shown in FIG. 18. In other words, a gas turbine engine GT comprises an intake fan Kf installed at the air intake port; a compressor Cp compressing the intake air; a combustor Bs burning fuel by using compressed air compressed by the compressor Cp; a turbine Tb which is driven by combustion gas ejected from the combustor Bs; and a nozzle Nz which ejects combustion gas to generate thrust. The intake fan Kf, the compressor Cp and the turbine Tb are connected to each other by the same rotating shaft. Driving the turbine Tb with combustion gas turns the rotating shaft, and drives the intake fan Kf and the compressor Cp.

A cooled turbine blade A1 shown in FIG. 1, FIG. 2, FIG. 3 and FIG. 4 is provided with a blade wall 11 forming the periphery of a cooled blade 1; a cooling passageway 12 which is a portion surrounded by the blade wall 11 for letting the cooling air flow therein; and an insert 2, which is an impingement cooling member for performing an impingement cooling, arranged inside the cooling passageway 12 to leave a predetermined gap t apart from an inner wall surface 111 of the blade wall 11.

The blade wall 11 has film-cooling holes 13 formed to penetrate from the inner wall surface 111 to an external wall surface 112. As shown in FIG. 2, a multiple number of film-cooling holes 13 are formed in a line in a direction intersecting the blade chord direction. A multiple number of the film-cooling holes 13 are also formed in a line in the blade chord direction, namely, formed in a so-called matrix configuration. Additionally, cooling air flowing out of the film-cooling holes 13 forms a cooling film on the external wall surface 112 of the blade wall 11 so as to cool the blade from the external surface.

As shown in FIG. 2 and FIG. 3, the insert 2 has a multiple number of through holes 21 having a small diameter (referred as "small holes 21" hereinafter) formed therein, and performs so-called impingement cooling, which is a cooling method of a blade that ejects the cooling air through the small holes 21 and blows the cooling air against the inner wall surface 111 of the blade wall 11.

Additionally, as shown in FIG. 3 and FIG. 4, a gap t between the inner wall surface 111 of the blade wall 11 of a cooled blade A and the insert 2 thereof has a sealing portion 14 mounted to partition off the gap t. The sealing portion 14 shuts off a flow of fluid flowing in the blade chord direction, and is formed integrally with the blade wall 11 herein, but not limited to this configuration. The sealing portion 14 may be formed in any other manner than that specifically described above; it may be formed integrally with the insert 2, or it may be formed as a separate member other than the blade wall 11 and the insert 2.

FIG. 4 shows a front view of the inner wall surface of a cooled blade when blade wall surface is cut into a rectangle. On the inner wall surface 111 shown in FIG. 4 flows a main stream of working fluid flowing inside a turbine from right to left in the figure (an arrow mark ar1 in the figure). In other words, the stream around the blade flows in the direction of the arrow mark ar1. As shown in FIGS. 3 and 4, the sealing portion 14 is arranged in the direction intersecting to the flowing the main stream (blade chord direction) between the adjacent film-cooling holes 13.

Arranging the sealing portion 14 in the above-mentioned manner makes it possible to prevent the occurrence, in the gap t between the inner wall surface 111 and the insert 2, of the stream of air flowing in the blade chord direction because of the distribution of static pressure around the blade and the like. When a flow occurs in the gap t, high temperature working fluid inside the turbine Tb flows reversely from the film-cooling holes 13, thereby deteriorating cooling performance of the blade. By installing the sealing portion 14 and thus preventing the stream of air current from generating, back flow has difficulty occurring, thus making it possible to restrain the deterioration of the cooling performance of the blade. Additionally, film-cooling holes are formed in a longitudinal direction of the blade surface (from the top/ bottom to the bottom/top in the figure) in a region partitioned off by the sealing portion 14. In this direction, pressure fluctuation is small and back flow is difficult to occur due to the above-mentioned reason.

Moreover, the above-mentioned embodiment of the present invention deals with an example in which film-cooling holes 13 are formed in the longitudinal direction (from the top/bottom to the bottom/top in the figure) of the blade surface in a region partitioned off by the sealing portion 14, but the embodiment is not limited to this arrangement. A region partitioned off by a sealing portion installed in the blade chord direction may have one film-cooling hole 13 formed therein, or may have a pre-determined quantity of adjacent film-cooling holes 13 formed therein.

Figure 5:
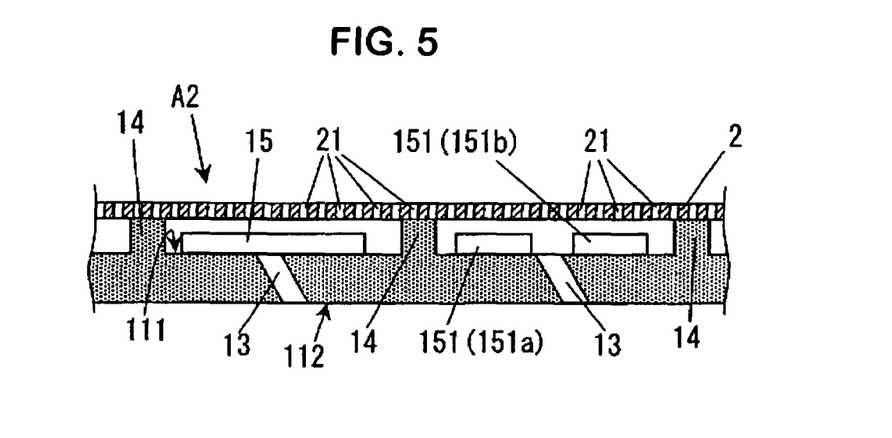
FIG. 5 through FIG. 9 are enlarged views of a cooled turbine blade in accordance with the embodiment of the present invention.
Figure 6:
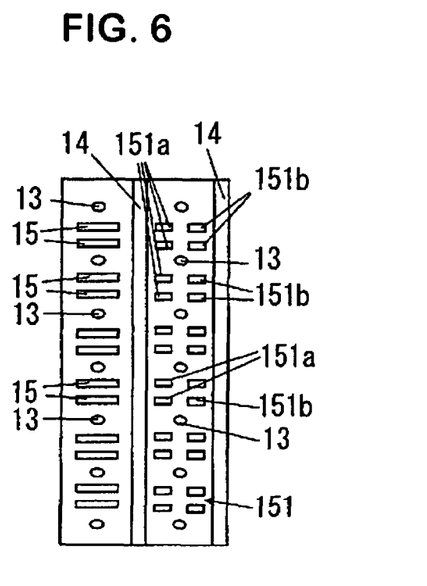
Figure 7:
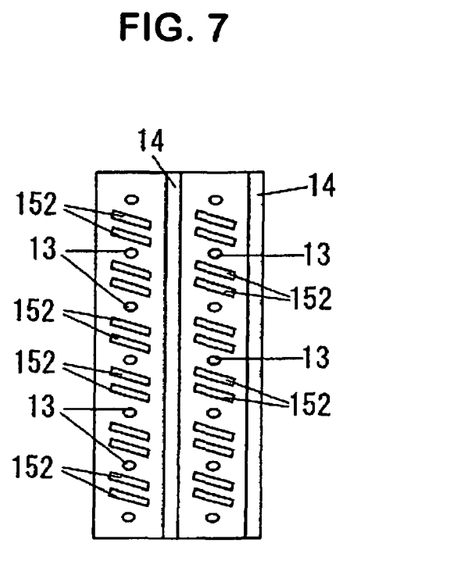
Figure 8:
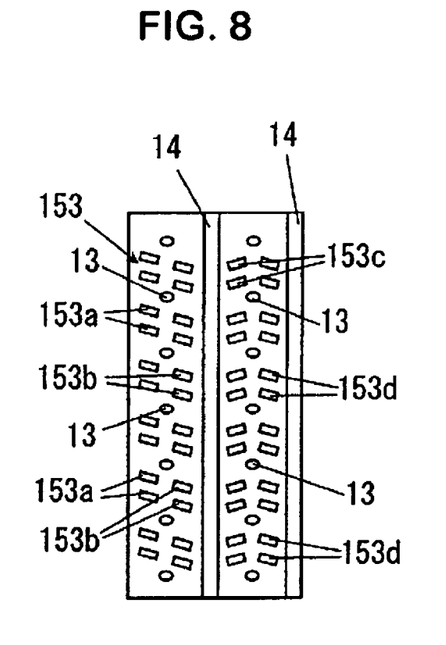
Figure 9:
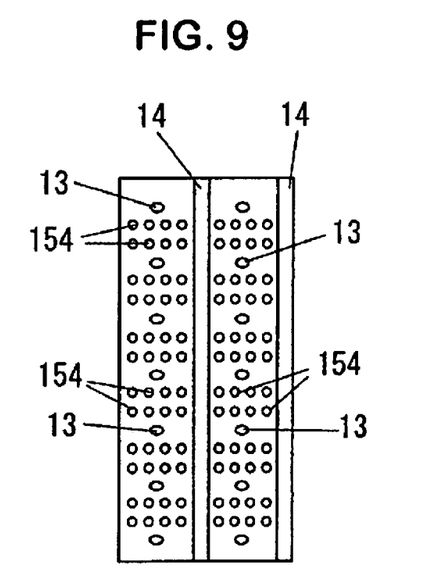

FIG. 5 shows an enlarged cross-sectional view of another embodiment of a cooled turbine blade in accordance with the present invention. FIG. 6 is a front view of an inner wall surface of the cooled blade shown in FIG. 5 when the blade wall surface is cut into a rectangle. FIG. 7, FIG. 8 and FIG. 9 show front views of inner wall surfaces of a plurality of kinds of protrusions. The cooled turbine blade shown in FIG. 5 and FIG. 6 is constructed in the same manner as the cooled turbine blade A1 shown in each illustration of FIG. 1, FIG. 2, FIG. 3 and FIG. 4, except that the inner wall surface thereof has protrusions formed thereon, and substantially the same members are denoted by the same reference symbols.

A cooled turbine blade A2 shown in FIGS. 5 and 6 has fin-shaped protrusions 15 formed on the inner wall surface 111. The protrusions 15 are, but are not limited to herein, protrusions in the shape of a fin extending in the orthogonal direction of the sealing portions 14.

The fin-shaped protrusions 15 are arranged so as not to contact with the insert 2, thereby making it possible to increase the surface area which the cooling air ejected from the small holes 21 for impingement cooling in the insert 2 is blown against. In the case of cooling the blade A2 with the same amount of cooling air, compared with a blade having no protrusions, the cooling air more easily becomes a turbulent flow, so that the blade A2 will have a high cooling capability. Additionally, since the fin-shaped protrusions 15 are mounted to the inner wall surface 111 against which the cooling air is blown, the cooling air blown against the fin-shaped protrusions 15 more easily becomes a turbulent flow, and by having the cooling air become a turbulent flow, the capability of the cooling air can be enhanced.

Furthermore, protrusions 151 may be installed as shown in FIGS. 5 and 6 and are divided into two and may be installed and include fin-shaped protrusions 151a and 151b. It may be illustrated that the fin-shaped protrusions 151a and 151b are arranged symmetrically about the film cooling holes 13. By this arrangement, the cooling air blown through the small holes 21 for impingement cooling in the insert 2 is blown against the fin-shaped protrusions 151a and 151b, resulting in a turbulent flow. After that, since there exist gaps for installing the fin-shaped protrusions 151a and 151b around the film-cooling holes 13, the cooling air is ejected smoothly through the film-cooling holes 13 to the outside of the blade, thus forming a cooling film on the external surface of the blade. The fin-shaped protrusions 151a and 151b are two-divided pieces, but are not limited to this. The number of divisions of the protrusions 15 may be selected in such a manner that the stream of the cooling air easily becomes a turbulent flow and that the cooling air flows into the film-cooling holes 13 smoothly.

Moreover, protrusions 152 shown in FIG. 7 are fin-shaped protrusions 152 which may be mounted, so as to incline to the sealing portions 14 at a predetermined angle. Accordingly, it is possible to make the cooling air ejected through the small holes 21 for impingement cooling in the insert 2 become a turbulent flow with high efficiency, and it is possible to enhance the cooling performance. Moreover, the protrusions shown in FIG. 7 show an example which a plurality of fin-shaped protrusions 152 are mounted in parallel, inclining to the same degree, but are not limited to this. It may be possible to change the angle of the fin-shaped protrusions in an appropriate manner so that the cooling air easily can become a turbulent flow.

Furthermore, protrusions 153 shown in FIG. 8 comprise fin-shaped protrusions 153a and 153b, thus divided into two, and may be mounted, so as to incline to the sealing portions 14 at a predetermined angle. Accordingly, the cooling air blown through the small holes 21 for impingement cooling in the insert 2 easily becomes a turbulent flow after it hits against the fin-shaped protrusions 153a and 153b, thereby being capable of cooling the inner wall surface 111 sufficiently, as well as of forming a cooling film by being ejected smoothly through the film-cooling holes 13 to the outside of the blade. Two-separated fin-shaped protrusions 153a and 153b are arranged in a line and adjacent fin-shaped protrusions 153 are placed so as to incline at the same inclining angle, but are not limited to this. Adjacent fin-shaped protrusions may be mounted with different inclining angles, and moreover, may be arranged in two lines spreading at the bottom as the fin-shaped protrusions 153c and 153d, divided into two.

Protrusions 154 shown in FIG. 9 are cylindrical protrusions 154 and may be arranged in a dispersing manner on a portion of the inner blade wall surface 111 where no film-cooling holes 13 are allocated. In this case, it is possible to generate a wider area where the cooling air hits, and at the same time, since the stream of the cooling air easily becomes a turbulent flow, a cooled turbine blade may accordingly have a higher cooling capability.

In case of being provided with any of the above-mentioned protrusions 15, 151, 152, 153 and 154, since it is possible to broaden the area where the cooling air hits, compared with a blade without protrusions being provided, efficient cooling is possible with the same amount of the cooling air. Additionally, any of the above-mentioned protrusions may be formed integrally with the inner wall surface 111, or may be formed separately and then mounted to the inner wall surface 111. Furthermore, since the protrusions 15, 151, 152, 153 and 154 are mounted to the blade wall 11, such effects can be expected as increasing the strength of the blade wall 11 and restraining resonance.

Figure 10:
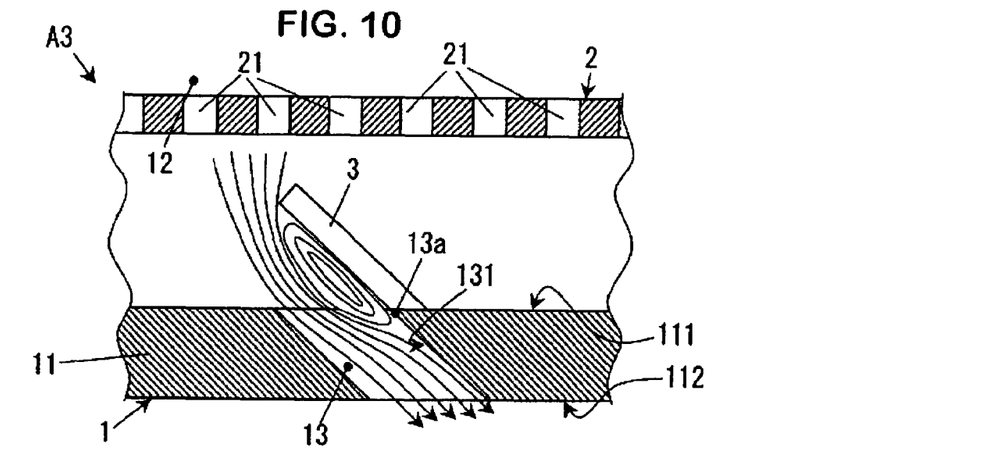
FIG. 10 through FIG. 12 depict a cooled turbine blade in accordance with the embodiment of the present invention.
Figure 11:
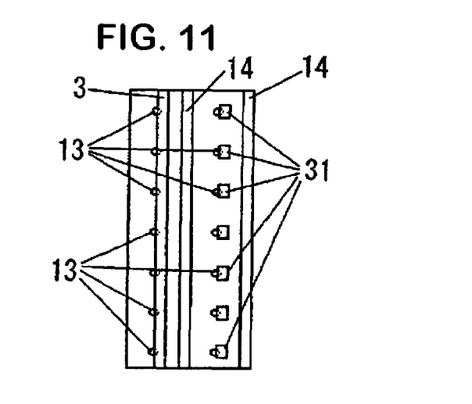

FIG. 10 is an enlarged cross-sectional view of the inside of a wall surface of a cooled turbine blade in accordance with an embodiment of the present invention. FIG. 11 depicts a configuration of the inner wall surface of a cooled turbine blade when the cooled blade is cut into a rectangle. The cooled turbine blade shown in FIGS. 10 and 11 substantially has a similar construction to that of a cooled turbine blade shown in each illustration in FIG. 1, FIG. 2, FIG. 3 and FIG. 4, except that a cooling-air-introducing member is provided thereto, and substantially the same portions are denoted by the same reference symbols.

A turbine cooled blade A3 shown in FIGS. 10 and 11 is provided with a cooling passageway 12 where the cooling air flows and an insert 2 which is installed in the cooling passageway 12, leaving a predetermined gap apart from the inner wall surface 111 of the blade wall 11. Through the blade wall 11 are formed film-cooling holes 13 penetrating from the inner wall surface 111 to the external wall surface 112 for the cooling air to flow. The film-cooling holes 13 are formed so as to incline to the blade wall 11 at a predetermined angle.

The inner wall surface 111 has a cooling-air-introducing member 3 mounted in a straight line with a curved portion 131 on the inner wall side of the film-cooling hole 13. When the cooling air flows through the film-cooling hole 13 and flows out to the outside of the blade, forming a cooling film, in the neighborhood 13a of the inner wall surface 111 of the curved portion 131 on the inner wall side of the film-cooling hole 13 occurs a so-called exfoliation phenomenon in which the cooling air flows away from the film-cooling hole 13. After that, the cooling air re-adheres on the curved portion 131 on the inner wall side of the film-cooling hole 13 near the external wall surface 112 and will be ejected through an opening on the side of the external wall surface 112.

Since, by installing the cooling-air-introducing member 3, the cooling air flows, taking the cooling-air-introduction member 3 as a part of the curved portion 131 on the inner wall side of the inner wall surface of the film-cooling hole 13, it is possible for the cooling air to have a sufficient length for its re-adherence, thus causing exfoliation to occur where the cooling-air-introducing member 3 is mounted and causing the cooling air to re-adhere to a portion in proximity to the inner wall surface 111 of the film-cooling hole 13. Therefore, the cooling air is ejected through the film-cooling hole 13 in a stable manner, thereby forming the cooling film stably.

Also, as shown in FIG. 11, the cooling-air-introducing member 3 may be formed integrally in the longitudinal direction of the blade face (from the top/bottom to the bottom/top in the figure), or each cooling-air-introducing member 31 may be installed for each film-cooling hole 13.

Figure 12:
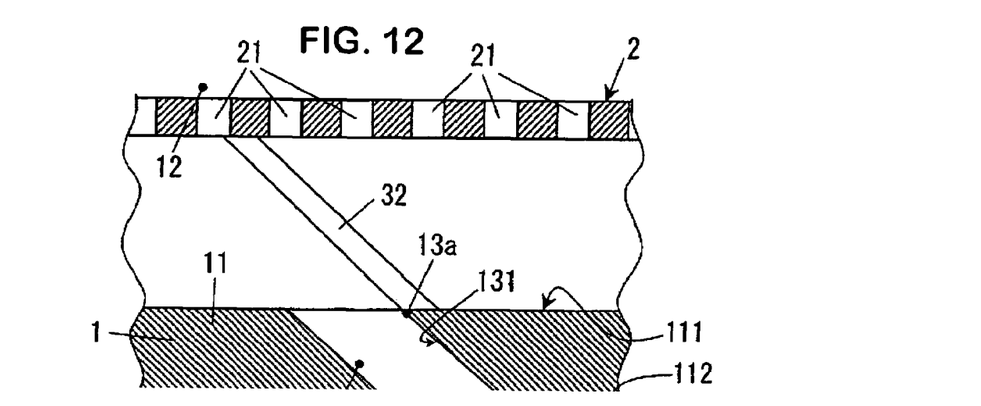

Moreover, as shown in FIG. 12, a cooling-air-introducing member 32 may be extended to the insert 2 and have an effect equivalent to the sealing portion 14. In this case, the sealing portion 14 does not have to be mounted separately, so that a simple construction is possible.

Also, a cooled turbine blade shown in each illustration in FIG. 10, FIG. 11 and FIG. 12 shows that a cooling-air-introducing member 3 is installed to the inner wall surface 111, which has an insert 2 for impingement cooling, but is not limited to this arrangement. The cooling-air-introducing member 3 may be installed to the inner wall surface 111 which has no insert 2 for impingement cooling mounted. When no inserts are mounted, a cooling-air-introducing member is mounted on the inner wall surface of the blade having no sealing portions formed, and the cooling-air-introducing member can act as a member which promotes the cooling air to become a turbulent flow.

Figure 13:
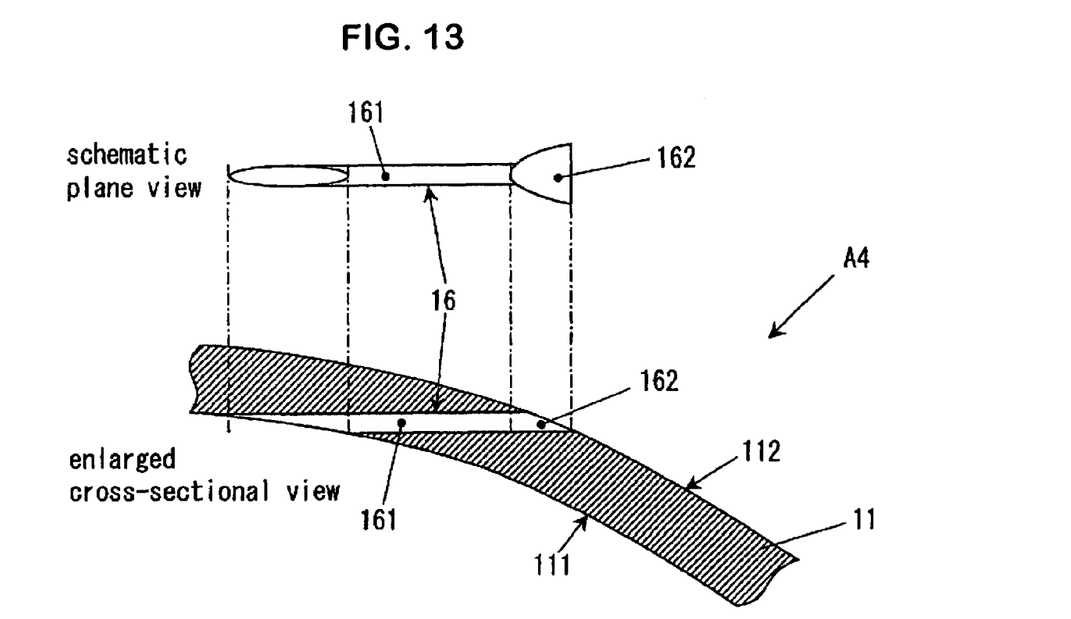
FIG. 13 and FIG. 14 are enlarged cross-sectional views of a cooled turbine blade in accordance with the embodiment of the present invention.
Figure 14:
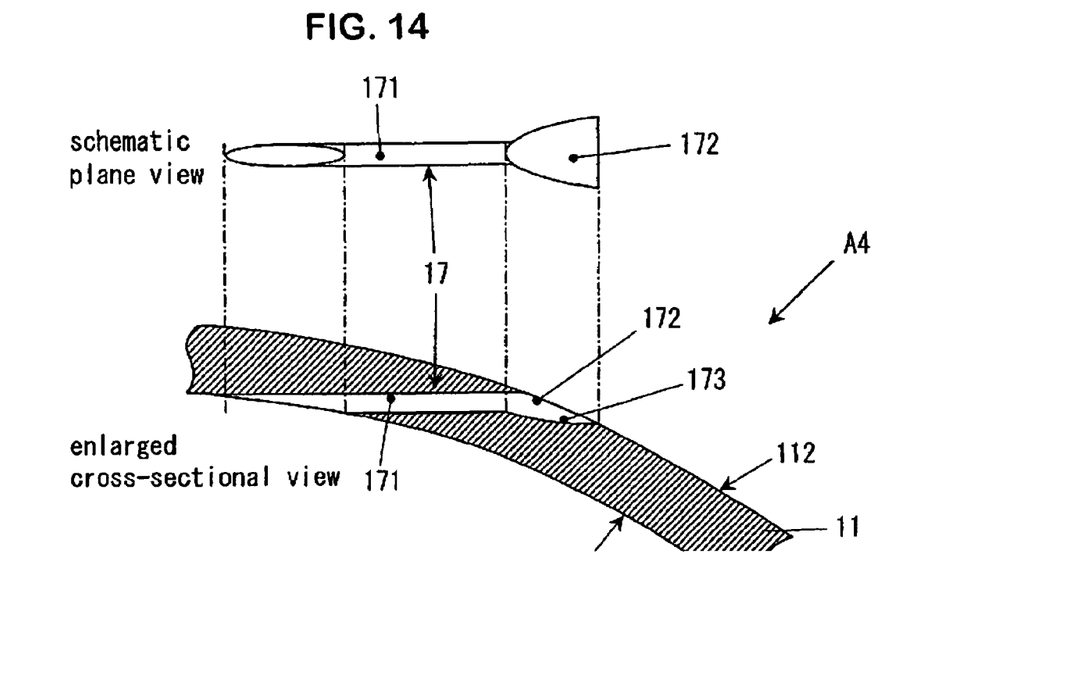

FIG. 13 shows a schematic plane view and enlarged cross-sectional view of a film-cooling hole portion of a cooled turbine blade in accordance with an embodiment of the present invention. FIG. 14 shows a schematic plane view and enlarged cross-sectional view of a cooled turbine blade provided with another example of a film-cooling hole. A cooled turbine blade A4 shown in FIG. 13 and FIG. 14 is the same as the cooled turbine blade A shown in each illustration in the FIGS. 1-4 series, except for the film-cooling holes. Substantially the same portions are denoted by the same reference symbols.

A film-cooling hole 16 of the cooled turbine blade A4 shown in FIG. 13 has a configuration combining a straight hole portion 161 and a shaped hole portion 162. The straight hole portion 161 is formed on the side of the inner wall surface 111 of the blade wall 11, and has a sufficient length L for the above-mentioned cooling air to flow stably after it exfoliates and re-adheres. After that is connected thereto a shaped hole 162 which has a configuration so as to spread wider on both sides along the blade wall 11. The spreading angle of the shaped hole portion 162 may be, but is not limited to, ten degrees through fifteen degrees, for example.

By having the film-cooling hole 16 formed with the straight hole portion 161 on the side of the inner wall surface 111, and formed with the shaped hole portion 162 at the end thereof on the side of the external wall surface 112, the cooling air can flow through the film-cooling hole 16 stably and form a cooling film having a high cooling performance on the external wall surface 112.

As a film-cooling hole 17 shown in FIG. 14, a shaped hole portion 172 may be combined on the side of the external wall surface of the straight hole portion 171 and may have a laid-back portion 173, which has a configuration so as to be dug in the direction intersecting the blade surface, formed in the shaped hole portion 172. By having the laid-back portion 173, the cooling air flow can be stabilized so that it can form a cooling film stably, thereby enhancing the cooling performance. The spreading angle of the laid-back portion 173 may be, but is not limited to, ten degrees through fifteen degrees, for example.

Figure 15:
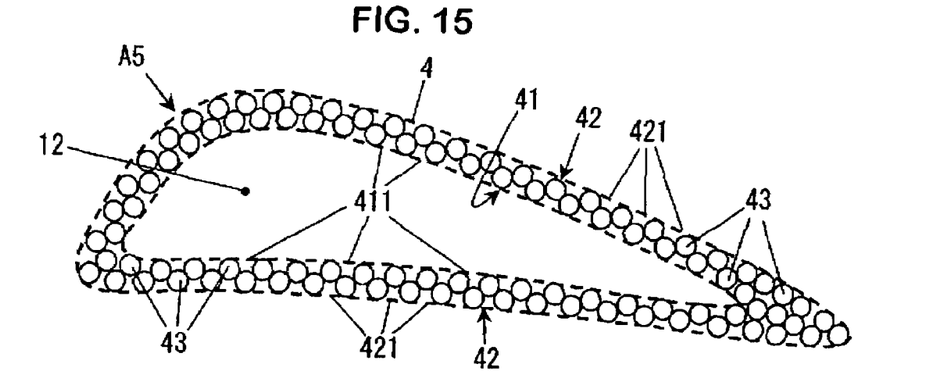
FIG. 15 through FIG. 17 depict a turbine cooled blade in accordance with the embodiment of the present invention.
Figure 16:
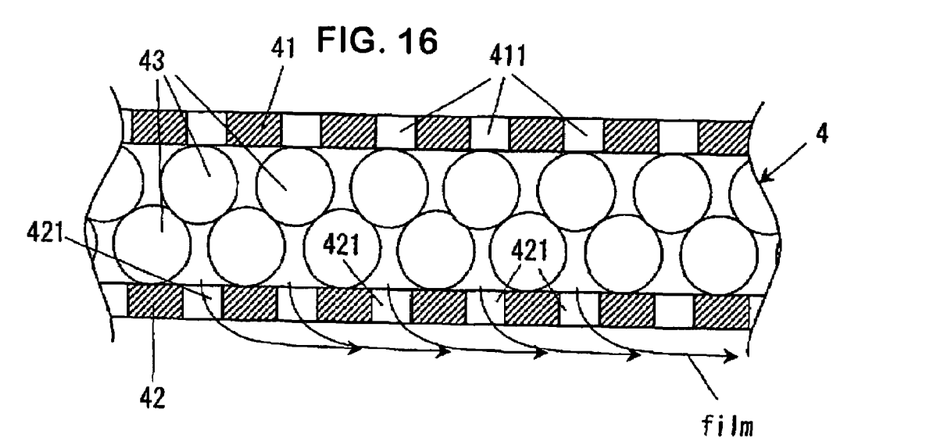

FIG. 15 is a cross-sectional view of a third embodiment of a cooled turbine blade in accordance with the present invention and FIG. 16 is an enlarged cross-sectional figure of a blade wall of the cooled turbine blade shown in FIG. 15. The cooled turbine blade A5 shown in each illustration in FIG. 15 and FIG. 16 has a space between an inner wall 41 and an external wall 42, formed in a thin plate, filled up with spherical members 43, which is adopted as a blade wall 4.

The inner wall 41 and the external wall 42 have small holes 411 and 421 formed therein for the cooling air to flow, wherein the diameters of the small holes 411 and 421 are smaller than the diameter of spherical members 43 sandwiched between the inner wall 41 and the external wall 42 and the cooling air flows but does not make the spherical members 43 go out of the gap between the inner wall 41 and the external wall 42.

Flowing of the cooling air through the gap of the spherical members 43 can cool the spherical members 43, and the inner wall 41 and the external wall 42 that are in contact with the spherical members 43, thereby performing a spurious transpiration cooling in the gap between the inner wall 41 and the external wall 42 where the spherical members 43 are arranged, owing a very high cooling performance. Additionally, by ejecting the cooling air through the small holes 421 in the external wall 42, the blade surface has a cooling film formed thereon, thereby cooling the blade wall from the outside.

By performing both a spurious transpiration cooling and a film cooling, it is possible to provide a cooled turbine blade having a very high cooling performance.

Figure 17:
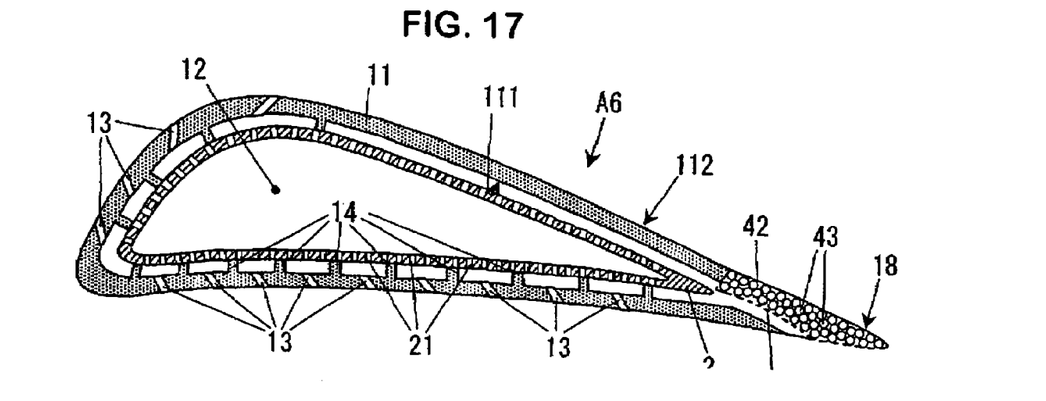

Additionally, as a cooled turbine blade A6 shown in FIG. 17, it is possible to depict a turbine blade having a blade wall wherein spherical members 43 fill up a gap between the inner wall 41 and the external wall 42 of only a trailing edge 18 of the blade. Generally, it is difficult to perform an impingement cooling and a film cooling in the trailing edge 18 of a blade, in which effective cooling is difficult. Moreover, the blade wall 4, which is formed by filling up the gap between the inner wall 41 and the external wall 42 with spherical members 43, is difficult to be manufactured, thereby requiring a large amount of manufacturing time and cost. Furthermore, it is very difficult to generate sufficient strength.

Therefore, portions which require sufficient strength and which can be cooled sufficiently by the impingement cooling and the film cooling are subject to the impingement cooling and the film cooling as described above, and only the portions which are difficult to be cooled and require less strength adopt a blade wall 4, wherein spherical members 43 fill up the gap between the inner wall 41 and the external wall 42. Consequently, it is possible to provide sufficient cooling performance to the entire cooled turbine blade and restrain manufacturing time and cost.

The cooled blades A1 through A4 shown in FIGS. 1-4 have an insert 2 for impingement cooling which is generally applied to stationary vanes, but it is not limited to this arrangement, and may be applied to rotating blades.

As described above, with the embodiments of the present invention, it is possible to enhance the cooling performance of a cooled turbine blade without increasing the cooling air, thereby making it possible to increase the operation efficiency of a gas turbine engine. Additionally, in spite of simple construction, it is possible to enhance the cooling performance of a cooled turbine blade and raise the operation efficiency of a gas turbine engine, restraining the manufacturing cost of the turbine blades to be low.

What is claimed is:

1. A cooled blade of a gas turbine engine, comprising:
a blade wall having an inner wall surface and an external wall surface;
a cooling passageway formed by said inner wall surface inside said blade wall of said cooled blade for the flow of cooling air therein;
film-cooling holes formed so as to penetrate through said blade wall from said inner wall surface and said cooling passageway to said external wall surface and so as to form a cooling film on said external wall surface of said blade wall;
an impingement cooling member arranged in said cooling passageway so as to be spaced with a predetermined gap from said inner wall surface of said blade wall, said impingement cooling member comprising a multiple number of small holes for ejecting cooling air; and
a sealing portion mounted in said gap between said impingement cooling member and said inner wall surface so as to divide said gap in a blade chord direction and so as to separate adjacent said film-cooling holes in the blade chord direction;
wherein said film cooling holes are holes that have a cylindrical and straight portion extending from said inner wall surface to the proximity of said external wall surface and further have a shaped portion spreading in a direction along said external wall surface in the proximity of said external wall surface, said shaped portion comprising a laid-back portion dug in a direction intersecting said external wall surface; and
wherein a multiple number of fin-shaped protrusions are provided on said inner wall surface in said gap and arranged in a line perpendicular to, or at a predetermined angle relative to, said sealing portion, each of said fin-shaped protrusions being divided so as to be arranged symmetrically about said film-cooling holes.

2. The cooled blade of claim 1, wherein:
said blade wall forms a trailing edge of said cooled blade, said trailing edge having a portion surrounded by a wall including a multiple number of small holes; and
said portion surrounded by said wall is filled with a multiple number of spherical members.

3. The cooled blade of claim 1, wherein:
said film-cooling holes are formed so as to incline at a predetermined angle of inclination to said inner wall surface; and
said inner wall surface has a cooling-air-introducing member installed so as to incline at the same angle of inclination as said film cooling holes and so as to form a straight line with an inner tube surface of one of said film cooling holes.

4. The cooled blade of claim 3, wherein:
said blade wall forms a trailing edge of said cooled blade, said trailing edge having a portion surrounded by a wall including a multiple number of small holes; and
said portion surrounded by said wall is filled with a multiple number of spherical members.

5. A cooled blade of a gas turbine engine, comprising:
a blade wall having an inner wall surface and an external wall surface;
a cooling passageway formed by said inner wall surface inside said blade wall of said cooled blade for the flow of cooling air therein, said cooling passageway extending in a longitudinal direction of said blade wall;
film-cooling holes formed so as to penetrate through said blade wall from said inner wall surface and said cooling passageway to said external wall surface and so as to form a cooling film on said external wall surface of said blade wall;
an impingement cooling member arranged in said cooling passageway so as to be spaced with a predetermined gap from said inner wall surface of said blade wall, said impingement cooling member comprising a plurality of small holes for ejecting cooling air; and
a plurality of sealing portions mounted in said gap between said impingement cooling member and said inner wall surface so as to divide said gap in a blade chord direction and so as to separate adjacent said film-cooling holes in the blade chord direction, said sealing portions extending in the longitudinal direction;
wherein said film cooling holes are holes that have a cylindrical and straight portion extending from said inner wall surface to the proximity of said external wall surface and further have a shaped portion spreading outwardly of the cylindrical and straight portion in the longitudinal direction along said external wall surface in the proximity of said external wall surface, said shaped portion comprising a laid-back portion spreading inwardly toward said inner wall surface from said external wall surface with respect to said cylindrical and straight portion in the proximity of said external wall surface; and
wherein a plurality of fin-shaped protrusions are provided on said inner wall surface in said gap and arranged in a line perpendicular to, or at a predetermined angle relative to, said sealing portions, each of said fin-shaped protrusions being divided so as to be arranged symmetrically about said film-cooling holes.

6. The cooled blade of claim 5, wherein:
said blade wall forms a trailing edge of said cooled blade, said trailing edge having a portion surrounded by a wall including a plurality of small holes; and
said portion surrounded by said wall is filled with a plurality of spherical members.

7. The cooled blade of claim 5, wherein:
said film-cooling holes are formed so as to incline at a predetermined angle of inclination to said inner wall surface; and
said inner wall surface has a cooling-air-introducing member provided so as to incline at the same angle of inclination as said film cooling holes and so as to form a straight line with an inner tube surface of one of said film cooling holes.

8. The cooled blade of claim 7, wherein:
said blade wall forms a trailing edge of said cooled blade, said trailing edge having a portion surrounded by a wall including a plurality of small holes; and
said portion surrounded by said wall is filled with a plurality of spherical members.

* * * * *